United States Patent Office 3,554,767
Patented Jan. 12, 1971

3,554,767
COATED CONFECTIONERY
Wilhelm Daum, deceased, late of Darmstadt, Germany, by Martin Daum, Elisabeth Daum, Wilfried Daum, and Irmgard Daum, heirs, all of Darmstadt, Germany, and Eberhard Nürnberg and Hans Joachim Sippel, Darmstadt, Germany, assignors to E. Merck A.G., Patentabteilung, Darmstadt, Germany
No Drawing. Continuation-in-part of application Ser. No. 835,823, Jan. 6, 1969, which is a division of application Ser. No. 449,637, Apr. 20, 1965, now Patent No. 3,420,931. This application Feb. 24, 1969, Ser. No. 802,759
Claims priority, application Germany, Apr. 23, 1964, M 60,752
Int. Cl. A23g *3/00;* A23l *1/27;* B44d *1/00*
U.S. Cl. 99—134                          16 Claims

ABSTRACT OF THE DISCLOSURE

An improved method for producing coated confectioneries wherein the confectionery coating solution comprises about 35–60% by weight of sugar and about 0.5–10% by weight of a vinyl polymer, such as polyvinyl pyrrolidone, this method permitting automatic operation, and markedly reducing the time conventionally employed for producing sugar coated candies. The resultant confectioneries are also claimed.

---

This is a continuation-in-part application of copending application S.N. 835,823, filed Jan. 6, 1969, a divisional of earlier application S.N. 449,637, filed Apr. 20, 1965, now Pat. 3,420,931, the claim of priority of German application M 60,752 filed Apr. 23, 1964, being maintained for this application.

This invention relates to the production of sugar-containing coatings on masses of ingestible solid material.

Whereas this invention is broadly directed to the production of sugar-containing coatings on shaped masses of ingestible solid material, it has particular application to the production of coated confectioneries.

For the purposes of this invention, a mass without a sugar-containing coating will be referred to as a "candy core" including but not limited to such ingestibles as chocolate, gum, raisins, nuts, etc.

Though it may appear to be a simple task, heretofore the production of sugar coated candies has been time-consuming. To build up an aesthetically acceptable coating of sufficient thickness, the practice has been to apply several thin coats with scrupulous care to prevent the candies from adhering to one another, as well as to avoid non-uniformity of the final product.

An object of htis invention, therefore, is to provide an improved process for the production of coated shaped masses of solid material, and in particular to an improved process for the production of sugar coated confectioneries.

Upon further study of the specification and claims, other objects and advantages of the present invention will become apparent.

To attain these objects, there is provided a process which basically comprises coating a core with an aqueous dispersion comprising, in percent by weight, 1 to 60, preferably 35 to 40% of a sugar and 0.5 to 10% of a vinyl polymer, preferably a polymer of vinyl pyrrolidone and/or a polymer of vinyl acetate.

It has been previously suggested to incorporate vinyl polymers, more particularly polyvinyl pyrrolidone, for the coating of medicaments in the manufacture of varnished or film-coated tablets. In this process, the compressed medicament is coated with a solution of these high molecular weight substances alone, the solutions being applied to the tablets or other pressings in any suitable way, for example, by spraying. Varnished or film-coated tablets obtained in this way cannot be regarded as dragées since they have only a thin coating of varnish consisting of the polymer and they do not have a conventional dragée coating made up principally of sugar and the above-mentioned additives. The use of a vinyl polymer in the coloring of dragées, that is, dragées, which already have the actual dragée coating, has also been described in the literature, Kohler et al., Deutsche Apotheker-Zeitung 102(1): 1–8, Jan. 4, 1962. The term "dragée" in its dictionary sense is defined as "anything sugar coated as a pill" (Funk & Wagnalls New Standard Dictionary of the English Language, page 756, 1942 Funk & Wagnalls Co.) (1a): a sugar coated nut, (b): a silver coated candy for decorating cakes, (2): a sugar coated medicated confection (Webster's Seventh New College Dictionary, page 251, 1963, G. & C. Merriam Co.). As used herein, the term dragée does not embrace medicated confections which are covered in the earlier application, now Pat. 3,420,911. The coating pigment suspension used contained 0.325% of polyvinyl pyrrolidone in addition to sugar and other substances and is used to color the dragées by pigment dyes, that is, only for the last stage of the dragées coating process.

If this suspension described in literature is used as the sole coating composition for the coating process and is applied to the uncoated cores, it is found that the coating process is very considerably lengthened unless pulverulent substances, such as talc, are additionally introduced into the rotating vessel. The surface of the dragées obtained tends to be sticky and a large number of application is necessary.

Using the coating composition according to the invention, it has surprisingly been found that the entire coating process can be carried out with this composition alone since it can be applied manually or by suitable apparatus, with or without spraying, without any inconvenient sticking. It has not been found necessary to additionally introduce pulverulent substances, such as talc, into the rotating vessel during the time of the coating process. With rationalized operation, the entire coating process can be carried out in one or two days. It was particularly unexpected that such a substantially improvement can be achieved by increasing the polymer from 0.325% to at least 0.5%, preferably to about 2%.

The preferred polymers include homopolymers of vinyl pyrrolidone, vinyl acetate, and vinyl alcohol, and copolymers of vinyl pyrrolidone-vinyl acetate, and vinyl alcohol-vinyl acetate. These polymers are characterized by their physiological compatability.

It has been particularly advantageous to apply commercial preparations of polyvinyl pyrrolidone with a dry content of at least 94 percent, a maximal ash content of 0.02 percent and a maximal monomer content of 0.8 percent, molecular weights between 10,000 and 800,000, preferably about 20,000 to 30,000, showing viscosity parameters K of between 17 and 90, preferably about 25.

(The viscosity parameter K is defined by the following equation:

$$\log Z = \left(\frac{75K^2}{1+1.5Kc}\right)c$$

wherein Z is the relative viscosity of a solution of the concentration $c$ volume percent.)

Another polymer which is used advantageously is a commercial copolymer of 60 percent vinyl pyrrolidone and 40 percent vinyl acetate with the following characteristics: dry content: at least 95 percent; maximal monomer content: 0.8 percent; viscosity parameter K: 34±6; nitrogen content: about 7.6%.

The molecular weight of the polymer can vary widely. In general, polymers of molecular weights between about 10,000 and 2,000,000 are applied. It is important, however, that the monomer content of the polymer is kept as low as possible because of the possibly toxic side effects of higher concentrations of some of the monomers. In general, monomer contents lower than 1 percent by weight are unobjectionable.

As for the other essential ingredients of the coating, the percent by weight of sugar in the aqueous suspension is 1 to 60, preferably 35 to 40. Various types of sugars can be employed, such as sucrose, glucose, sorbitol, mannitol, etc.; it is preferable, however, to use sucrose.

Aside from water, sugar and polymer, it is possible to incorporate other materials in the dispersion. The effectiveness of the vinyl polymers, particularly of the polyvinyl pyrrolidone, can be increased by adding other high-molecular compounds, such as cellulose derivatives, e.g. methyl cellulose, ethyl cellulose, carboxymethyl cellulose, hydroxyethyl cellulose, hyrdoxypropyl cellulose, or starches, e.g. potato, corn, wheat, rice starch, or starch gum. It is, for instance, possible to reduce the polymer content to one-half of the original by adding about 0.5 percent by weight of one of the cellulose derivatives mentioned. This is a considerable economical and, in some cases, also a processing improvement.

Moreover, the suspension may contain pigments, such as titanium dioxide or calcium carbonate, lubricants (talc or finely divided silica), fillers such as flour, binders, plasticizers and/or softeners, e.g. glycerine, and preservatives. Usually, in accordance with one advantage of this invention, the addition of preservatives can be avoided because it is possible to work up a batch in a few days and during this time no growth of bacteria or fungi occurs.

The viscosity of the final dispersion can vary widely, depending on the composition of it, furthermore, on temperature, air content, thixotropic effects, previous agitation and even time. In general, the viscosity of the dispersion is between 500 and 15,000 preferably about 2000 centipoises.

By using the dispersion of this invention, it was surprisingly discovered that it is possible to conduct the entire coating process only with one coating composition. This is the case because the dispersion of this invention can be applied either manually or mechanically, with or without spraying, and without the candies sticking to one another. Of most importance is that it is possible to carry out the entire coating process within one to two days. In contrast thereto, the average working time for the manufacture of one batch according to the conventional process is approximately one week. Thus, compared with the usual process, the new process represents a considerable saving of time, resulting in substantial labor savings, as well as in substantially increased plant capacity.

As another distinct advantage, the dispersion of this invention is so stable that it is unnecessary during the course of candy manufacture to use mixing or stirring devices, pumps, or other homogenizing equipment to prevent settling. A still further advantage of the invention consists in the fact that during the course of the whole process, there is no requirement for organic solvents. Moreover, during the course of the process it is unnecessary to employ intermediate drying steps for which purpose, in the usual coating processes, the dragées had to be removed temporarily from the coating vessel.

Heretofore, in the usual coating processes, it has always been necessary during the course of the coating procedure to introduce powdery materials into the coating suspension. This was done by either the coating operator in a strewing motion, or by the use of complicated spray equipment always being subject to both clogging and breakdown. In contrast, the process of this invention avoids such disadvantages, because according to this process, it is possible to apply the suspension onto the candy cores at room temperature, manually or by machine, without the necessity of either spraying or strewing in powdery materials.

The application of the coating dispersion can be adapted to different types of operation. It is possible to lay on the coating either manually, or semi-automatically or completely automatically. The suspension can be applied by spraying or it can be poured in liquid form directly onto the cores tumbling in an angularly oriented rotating kettle. The suspension is applied until the material to be coated is well moistened. The kettle is then allowed to rotate until the coated cores no longer adhere to one another but instead roll freely. Finally, the coated cores are dried under continuous rotation, preferably with the aid of a warm air stream, or an infrared lamp, or any other equivalent drying means. These steps can be conducted continuously; and it is possible, in this connection, to shorten or even omit the rotating phase (second phase) during the first coating applications. It is also unnecessary to remove the candies from the coating vessel during the course of the entire coating procedure in order to post-dry them, perhaps under vacuum or in drying chambers. A further essential advantage of this invention consists in that all of the process steps can be conducted at ambient temperature. In general, each core is coated with 2 to 500, preferably 50 to 80 separate thin coats, each coat having a thickness of 0.5 to 200$\mu$, preferably 5 to 20$\mu$.

A particularly economical mode of conducting the process comprises passing a predetermined volume of the suspension through a relay-controlled solenoid valve into the dragee coating vessel to cover the dragees rolling around therein. Suitably, a three-phase time relay is employed, such that in the first phase the suspension is passed through the solenoid valve; in the second phase the rotating operation is conducted, the duration of which can be varied; and in the third phase the heating device is actuated. The suspension can be applied onto cores whose surface is not pretreated. However, it is also possible to coat cores which have been previously provided with a sugarless coating, for instance with a lacquer coating resistant to stomach acids.

The sugar coated candies produced in accordance with this invention cannot be distinguished by their exterior from those which are produced according to the classical method of coating dragees. They likewise taste sweet, can be colored, exhibit a natural silky sheen, and can, if desired, be lacquered. Their elastic and mechanical strengths meet the highest requirements.

The quantity of suspension depends on the weight and the shape of the candy cores. Normally, the quantity is preferably at least about 1%, especially 10 to 100% of the weight of the core, on a dry basis.

With respect to the finished product, the ratio of the components in the coating is the same as that of the coating solution, the exception being, of course, that water and/or other solvents are absent in the final coating.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The following examples are those for the manufacture of the suspension to be employed according to this invention.

EXAMPLE 1

| | Percent |
|---|---|
| Polyvinyl pyrrolidone | 4 |
| Titanium dioxide | 4.5 |
| Calcium carbonate | 4.5 |
| Talc | 14.5 |
| Glycerine | 2 |
| Sucrose | 38 |
| Water | 32.5 |

Polyvinyl pyrrolidone is dissolved in water; then, the remaining components are added under constant stirring; thereafter, the mixture is passed through a fine sieve or a homogenizing device.

EXAMPLE 2

| | Percent |
|---|---|
| Methyl cellulose | 0.5 |
| Polyvinyl pyrrolidone | 2.0 |
| Aerosil (particulate $SiO_2$) | 4.0 |
| Titanium dioxide | 4.5 |
| Calcium carbonate | 4.5 |
| Talc | 14.5 |
| Glycerine | 2.0 |
| Sucrose | 38.0 |
| Water | 30.0 |

EXAMPLE 3

| | Percent |
|---|---|
| Hydroxyethyl cellulose | 0.5 |
| Polyvinyl pyrrolidone-polyvinyl acetate copolymer (porportion 6:4) | 2.0 |
| Titanium dioxide | 4.5 |
| Calcium carbonate | 4.5 |
| Talc | 18.5 |
| Glycerine | 2.0 |
| Sucrose | 38.0 |
| Water | 30.0 |

EXAMPLE 4

| | Percent |
|---|---|
| Swelling amylose | 0.5 |
| Polyvinyl alcohol | 2.0 |
| Titanium dioxide | 4.5 |
| Calcium carbonate | 4.5 |
| Talc | 18.5 |
| Glycerine | 2.0 |
| Sucrose | 38.0 |
| Water | 30.0 |

EXAMPLE 5

| | Percent |
|---|---|
| Carboxy methyl cellulose | 0.5 |
| Polyvinyl alcohol-polyvinyl acetate copolymer | 2.0 |
| Titanium dioxide | 4.5 |
| Calcium carbonate | 4.5 |
| Talc | 18.5 |
| Glycerine | 2.0 |
| Sucrose | 38.0 |
| Water | 30.0 |

EXAMPLE 6

| | Percent |
|---|---|
| Methyl cellulose | 0.5 |
| Polyvinyl pyrrolidone (average molecular weight 650,000) | 0.5 |
| Titanium dioxide | 4.5 |
| Calcium carbonate | 4.5 |
| Talc | 20.0 |
| Glycerine | 2.0 |
| Sucrose | 38.0 |
| Water | 38.0 |

EXAMPLE 7

| | Percent |
|---|---|
| Methyl cellulose | 0.5 |
| Polyvinyl pyrrolidone (average molecular weight 10–15,000) | 10.0 |
| Titanium dioxide | 4.5 |
| Calcium carbonate | 4.5 |
| Silicon dioxide | 4.0 |
| Talc | 6.5 |
| Glycerine | 2.0 |
| Sucrose | 38.0 |
| Water | 30.0 |

EXAMPLE 8

| | Percent |
|---|---|
| Methyl cellulose | 0.5 |
| Polyvinyl pyrrolidone | 2.0 |
| Aerosil (particulate $SiO_2$) | 4.0 |
| Titanium dioxide | 6.5 |
| Calcium carbonate | 6.5 |
| Magnesium stearate | 2.5 |
| Glycerine | 3.0 |
| Sucrose | 45.0 |
| Water | 30.0 |

The following examples are those for producing the dragées of this invention:

EXAMPLE 9

26 kg. of cores, each core weighing 65 mg. and consisting of chocolate are mixed manually in a conventional dragée vessel having a diameter at the opening of 90 cm., with 0.5 liter of a suspension (produced in accordance with Example 2), at a rate of rotation of 15 revolutions per minute. The rotation is continued for 10 minutes and then for a further 10 minutes with forced hot air (temperature 30–40° C.; 4.5 m.³/minute). This process—coating, rotating, drying—is repeated over again until a weight of the individual coated cores of 100 mg. is reached. Finally, the candies are kept in motion for a while longer with air being blown in, for the purpose of obtaining a silky sheen which is preserved by applying a solution of beeswax in carbon tetrachloride, or another suitable polishing agent, and subsequent rotating for 1 to 2 hours. Total duration of the dragée production process: 16 hours (2 working days).

EXAMPLE 10

40 kg. of cores, each core weighing 420 mg. and consisting of gum are placed into a dragée coating vessel of a width of 90 cm. at its opening. 25 kg. of a suspension, produced according to Example 5 and mixed with 1% coloring agent (Tartrazine, Hydrazine yellow, FD & C yellow No. 5), are added piecemeal at ambient temperature from a storage vessel with the aid of a solenoid valve controlled by means of a 3-phase timing relay. The three phases of the relay are set as follows: 1st phase (coating application): 5 seconds; 2nd phase (rotating without hot air supply); 10 minutes; 3rd phase (rotating with hot air blown in as in Example 8): 10 minutes. The dragée coating process is continued until the individual weight of the resultant dragée amounts to 600 mg., whereupon a polishing step is conducted as in Example 8. Total duration of dragée manufacturing process: 16 hours (2 working days).

By means of this process, candies are obtained which can have a coating that is colored in all layers. It is also possible to utilize first a colorless suspension and to apply a colored suspension only at the end of the dragée producing process.

From the preceding examples, it is seen that this invention provides a substantial improvement in the sugar coating of ingestible shaped masses of solid material.

Where as the preceding example indicated specific time cycles of (a) a coating application, (b) a rotating step, and (c) a drying step, it is to be understood that these times can be varied greatly, the important consideration being that on a comparative basis, the coating dispersion of this invention provides improved results over prior art coatings used for the same purpose. For preferred operation, however, the following time cycles are used:

| Step: | Time |
|---|---|
| (a) Coating application | 1 to 60 seconds. |
| (b) Rotating (tumbling) time in a conventional dragée coater having a 90 cm. diameter at the opening and a rotational velocity of 5 to 60 revolutions per minute. | 1 to 60 minutes. |
| (c) Drying time with either forced air having a temperature of 20 to 70° C., or an equivalent heat input. | 1 to 60 minutes. |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A sugar coated confectionery consisting essentially of an inner medicament-free dragée, chocolate, chewing gum, raisin, nut or like candy core coated with at least about 1% of the weight of the core, on a dry basis, constituting 2–500 separate thin coats, each coat having a thickness of about 0.5–200 microns, and dried from an aqueous dispersion comprising about 35–60% by weight of a sugar and about 0.5–10% by weight of a vinyl polymer selected from the group consisting of homopolymer of vinyl pyrrolidone, homopolymer of vinyl acetate, homopolymer of vinyl alcohol, copolymer of vinyl pyrrlidone-vinyl acetate and copolymer of vinyl alcohol-vinyl acetate.

2. A coated confectionery as defined by claim 1 wherein said vinyl polymer is polyvinyl pyrrolidone.

3. A coated confectionery as defined by claim 1 wherein said coats further comprise not more than about 30% by weight of another solid material selected from the group consisting of talc, finely divided silica, calcium carbonate, titanium dioxide and mixtures thereof.

4. A coated confectionery as defined by claim 1 wherein said aqueous dispersion further comprises about 0.5% by weight of a member selected from the group consisting of methyl cellulose, ethyl cellulose, carboxymethyl cellulose, hydroxyethyl cellulose, hydroxypropyl cellulose, and starch.

5. A coated confectionery as defined by claim 1 wherein said coats comprise about 10–100% by weight of the core, on a dry basis.

6. A coated confectionery as defined by claim 1 wherein at least 50 separate thin coats are employed.

7. A coated confectionery as defined by claim 2 wherein said coats comprise about 10–100% by weight of the core, on a dry basis.

8. A coated confectionery as defined by claim 1 wherein the aqueous dispersion contains at least about 2% of the vinyl polymer.

9. A coated confectionery as defined by claim 2 wherein the aqueous dispersion contains at least about 2% of the polyvinyl pyrrolidone.

10. A process for the production of a coated confectionery as defined by claim 1 comprising the steps of pouring the aqueous dispersion directly on cores tumbling in an angularly oriented rotating kettle; continuing the rotating until the coated cores roll freely; and then drying the coated cores.

11. A process as defined by claim 10 wherein the process is conducted automatically.

12. A process as defined by claim 10 wherein the coated cores are not removed from the kettle until the entire number of coats are applied.

13. A process as defined by claim 10 wherein all the steps are conducted at ambient temperatures.

14. A process as defined by claim 10 wherein the process is conducted automatically in the same kettle, the time for the coating step being 1–60 seconds, the time for the rotating step being 1–60 minutes, and the time for drying being 1–60 minutes, the entire process taking not more than two days.

15. A sugar coated confectionery as defined by claim 1, wherein at least one of said separate sugar coats contain a coloring agent.

16. A sugar coated confectionery as defined by claim 1, further comprising an outer polishing coat of beeswax.

References Cited

UNITED STATES PATENTS

| 3,331,696 | 7/1967 | Rieckmanne et al. | 424—35X |
| 3,420,931 | 1/1969 | Daum et al. | 424—33 |
| 3,456,050 | 7/1969 | Rieckman et al. | 424—35 |

OTHER REFERENCES

Kohler et al., Deutsche Apotheker-Zeitung 102(1):1:8, Jan. 4, 1962.

SHEP K. ROSE, Primary Examiner

U.S. Cl. X.R.

99—23, 100, 104, 126, 135, 138, 141, 148, 161, 166; 106—162, 210; 117—100, 104, 105.3, 105.4, 161.16; 424—33.35